United States Patent
Xu et al.

(10) Patent No.: US 8,360,403 B2
(45) Date of Patent: Jan. 29, 2013

(54) HYDRAULIC MOUNT AND FILLING DEVICE FOR THE SAME

(75) Inventors: Jian Xu, Shenzhen (CN); Shengjie Wang, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 259 days.

(21) Appl. No.: 12/671,023

(22) PCT Filed: Jul. 25, 2008

(86) PCT No.: PCT/CN2008/071751
§ 371 (c)(1),
(2), (4) Date: Apr. 2, 2010

(87) PCT Pub. No.: WO2009/015588
PCT Pub. Date: Feb. 5, 2009

(65) Prior Publication Data
US 2010/0187734 A1 Jul. 29, 2010

(30) Foreign Application Priority Data
Jul. 27, 2007 (CN) .................. 2007 2 0121852 U

(51) Int. Cl.
*F16F 13/06* (2006.01)
(52) U.S. Cl. .................. 267/140.13; 267/140.14
(58) Field of Classification Search .. 267/140.11–141.7; 248/550, 562, 566
See application file for complete search history.

(56) References Cited

U.S. PATENT DOCUMENTS

| | | | |
|---|---|---|---|
| 4,159,091 A | 6/1979 | Le Salver et al. | 248/562 |
| 4,401,298 A | 8/1983 | Eaton et al. | 267/140.1 |
| 4,505,461 A | 3/1985 | Kakimoto | 267/140.1 |
| 4,905,955 A | 3/1990 | Brizzolesi et al. | 248/562 |
| 6,299,148 B1 * | 10/2001 | Miyamoto et al. | 267/140.12 |

(Continued)

FOREIGN PATENT DOCUMENTS
CN 1952431 A 4/2007
DE 10 2005 032 445 B3 9/2006
(Continued)

OTHER PUBLICATIONS

International Search Report and Written Opinion, PCT/CN2008/071751, Nov. 6, 2008, 13 pages.

(Continued)

*Primary Examiner* — Christopher Schwartz
(74) *Attorney, Agent, or Firm* — Morgan, Lewis & Bockius LLP

(57) ABSTRACT

A hydraulic mount and a filling device for the hydraulic mount are provided. The hydraulic mount (1) comprises a casing (2) and a support body (6, 7) arranged in an upper part of the casing (2), wherein, the casing (2) and the support body (6, 7) define a chamber (3), and the chamber (3) receives liquid and is divided by a partition into an upper chamber and a lower chamber. An orifice is formed in the partition, so that the upper chamber and the lower chamber are communicated with each other. A through hole (4) for communicating the chamber (3) with the exterior is formed in the support body (6, 7), and a sealing member (5) is arranged in the through hole (4). The filling device for the hydraulic mount (1) comprises a liquid tank (8) and a vacuum extractor (9), wherein, either the liquid tank (8) or the vacuum extractor (9) is connected to the through hole (4) in the hydraulic mount (1) through a pipe in a sealed manner.

3 Claims, 3 Drawing Sheets

U.S. PATENT DOCUMENTS

| | | | |
|---|---|---|---|
| 6,422,545 B1 | 7/2002 | Baudendistel et al. | 267/140.13 |
| 6,485,005 B1 | 11/2002 | Tewani et al. | 267/140.13 |
| 2003/0057620 A1* | 3/2003 | Muramatsu et al. | 267/140.14 |

FOREIGN PATENT DOCUMENTS

| | | |
|---|---|---|
| GB | 2 104619 A | 3/1983 |
| JP | 57 107916 A | 7/1982 |
| JP | 61 059033 A | 3/1986 |
| JP | 9 210118 A | 8/1997 |
| JP | 2000 065124 A | 3/2000 |
| JP | 2000 065125 A | 3/2000 |
| JP | 2001 241489 A | 9/2001 |
| JP | 2003 194136 A | 7/2003 |
| WO | WO 2007 103003 A2 | 9/2007 |

OTHER PUBLICATIONS

International Search Report and Written Opinion for International Application No. PCT/CN2008/071751.

* cited by examiner

HYDRAULIC MOUNT AND FILLING DEVICE FOR THE SAME

CROSS REFERENCE TO RELATED APPLICATIONS

This Application is a United States National Stage Application filed under 35 U.S.C. §371 of PCT patent application Ser. No. PCT/CN2008/071751 filed on Jul. 25, 2008 which claims benefit of and priority to Chinese Patent Application Serial No. 200720121852.1 filed Jul. 27, 2007, the disclosures of all of which are hereby incorporated by reference in their entirety.

FIELD OF THE INVENTION

The present invention relates to the technical field of vibration damping, in particular to a hydraulic mount and a filling device for the hydraulic mount.

BACKGROUND OF THE INVENTION

As the technology develops continuously, how to implement vibration damping has become a problem that receives more and more attention, especially on transportation facilities that have severe vibrations, such as automobiles. When the automobile runs, the vibrations mainly come from two sources, one of which is vibrations transferred from the road pavement via the tires and vibration absorbers to the main body of the automobile, and the other of which is vibrations transferred from the engine via the engine mount to the main body of the automobile. Therefore, as an important component that has effect on the vibrations, the engine mount has direct influence on the driving comfort of the automobile.

A good engine mount must have low dynamic stiffness against high-frequency vibrations and a high damping coefficient against low-frequency vibrations. In the prior art, engine mounts are mainly in two categories, that is full rubber mounts and hydraulic mounts. Due to the fact that the dynamic stiffness and loss coefficient of full rubber mounts are inherent characteristics of rubber material and will increase as the vibration frequency increases, ordinary rubber mounts can't meet the requirements of technical development. In order to improve the performance of rubber mount to meet the requirement for low dynamic stiffness against high-frequency vibrations and high damping coefficient against low-frequency vibrations, Volkswagen (Germany) pioneered to employ a mount with a liquid sealing structure in 1979, i.e., the so-called hydraulic mount. In addition, as consumers' demand for driving comfort of automobiles is higher and higher, hydraulic mounts are widely applied in all kinds of automobiles increasingly.

A hydraulic mount for engine was disclosed in CN2849321Y. As shown in FIG. 1, the hydraulic mount comprises a fixing base 11, an elastic body 12 arranged in the fixing base 11, and a support 13 that is integral with the elastic body 12 and is connected to the inner wall of the fixing base 11, an upper chamber 21 and a lower chamber 22 which are separated by a partition 20 are formed below the elastic body 12, wherein, the upper chamber 21 and the lower chamber 22 are communicated with each other through an orifice formed in the partition 20, a damping fluid is sealed in the upper chamber 21 and the lower chamber 22. In addition, in order to ensure the damping performance of the hydraulic mount, the chambers shall have no air as far as possible.

The disadvantages of such existing hydraulic mounts include: first, due to the complex structure, it is difficult to discharge air from the chambers thoroughly during the assembling process, and thereby the damping performance of the hydraulic mount will be affected directly. Second, in order to ensure that there is no air in the chambers as far as possible, usually the product is assembled and the damping liquid is filled in a liquid environment, as the result, the working environment is poor, the working space is moist, and the workers' hands have to be immersed in liquid for long, which has a strong impact on the workers' physical health. Moreover, since the product is assembled in a liquid environment, the workers are unable to see the assembling process directly; therefore, products with poor quality are often manufactured in the assembling process, and it is difficult to control the filling amount of the damping liquid.

SUMMARY OF THE INVENTION

An object of the present invention is to provide a hydraulic mount, into which the damping liquid can be filled conveniently.

Another object of the present invention is to provide a filling device for hydraulic mount, which can ensure that there is no air in the hydraulic mount after the damping liquid is filled and avoid the requirement for assembling and filling in a liquid environment; therefore, the visibility in the assembling process and the working environment can be improved.

The hydraulic mount according to the present invention comprises a casing and a support body arranged in an upper part of the casing, the casing and the support body define a chamber, the chamber receives liquid and is divided by a partition into an upper chamber and a lower chamber; an orifice is formed in the partition, so that the upper chamber and the lower chamber are communicated with each other; wherein, a through hole for communicating the chamber with the exterior is formed in the support body, and a sealing member is arranged in the through hole.

In the hydraulic amount according to the present invention, the damping liquid can be filled conveniently into the chamber through the through hole; and after the damping liquid is filled, the through hole can be sealed with the sealing member; in that way, the filling operation for the hydraulic amount becomes more convenient and easier.

The filling device for the hydraulic amount according to the present invention comprises a liquid tank and a vacuum extractor, wherein, either the liquid tank or the vacuum extractor is connected to the through hole in the hydraulic mount in a sealed manner through a pipe.

In the filling device for the hydraulic mount according to the present invention, the vacuum extractor can be communicated with the through hole in the hydraulic mount first, so as to extract the chamber in the hydraulic mount into a negative pressure state; then, the liquid tank can be communicated with the through hole in the hydraulic mount, so as to suck the damping liquid in the liquid tank into the chamber in the hydraulic mount under negative pressure; finally, the through hole in the hydraulic mount can be sealed with the sealing member. In that way, the filling operation is completed.

Since the vacuum extractor is employed in the filling device in the present invention, there will be no air in the hydraulic mount after filling the damping liquid; therefore, the damping performance of the hydraulic mount can be ensured. In addition, since the entire assembling and filling process needn't to be performed in a liquid environment, the visibility in the assembling process can be improved and the defective rate can be decreased effectively, and the workers' working environment can be improved greatly.

DETAILED DESCRIPTION OF THE EMBODIMENTS

Hereafter the present invention will be described in detail with reference to the accompanying drawings.

Figure 1:
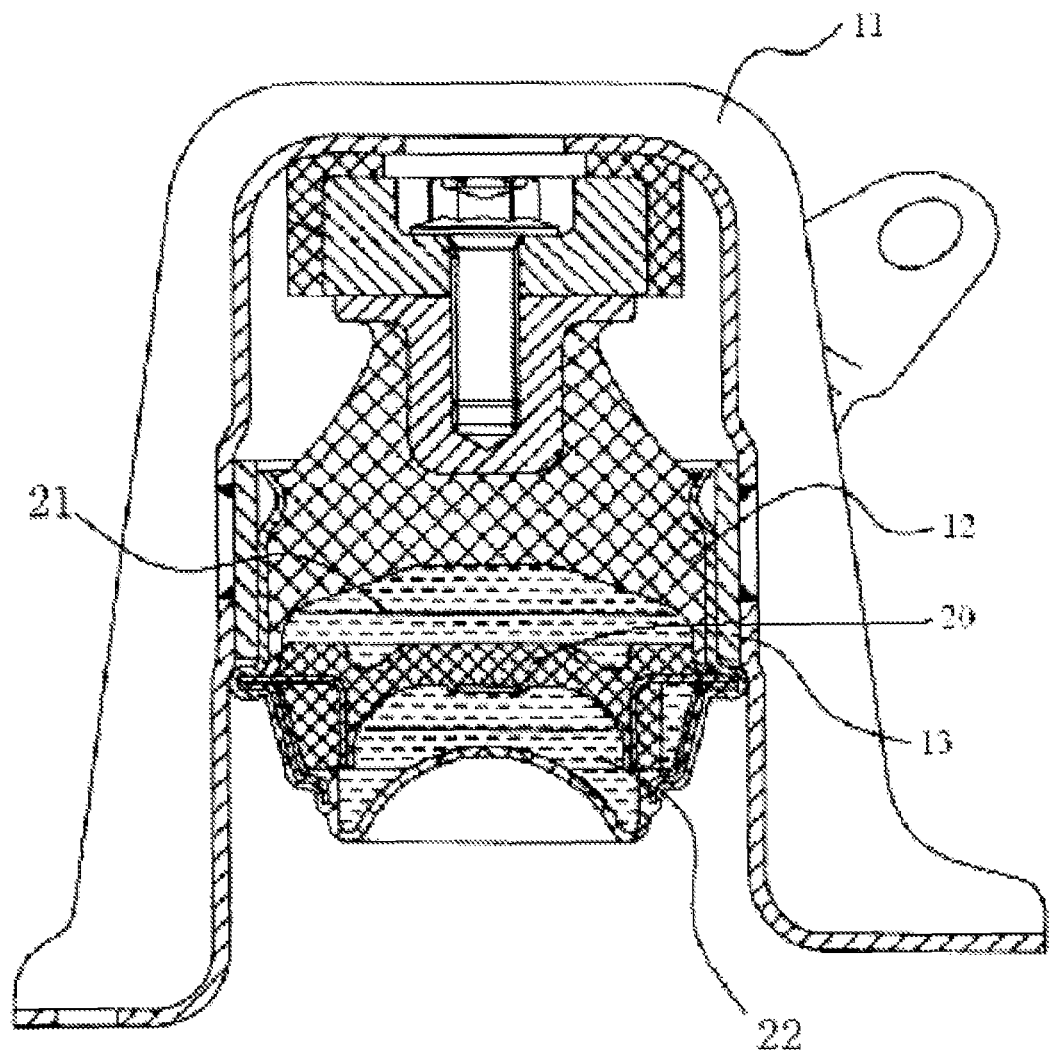
FIG. 1 is a schematic structural view of the hydraulic mount for engine disclosed in CN2849321Y.
Figure 2:
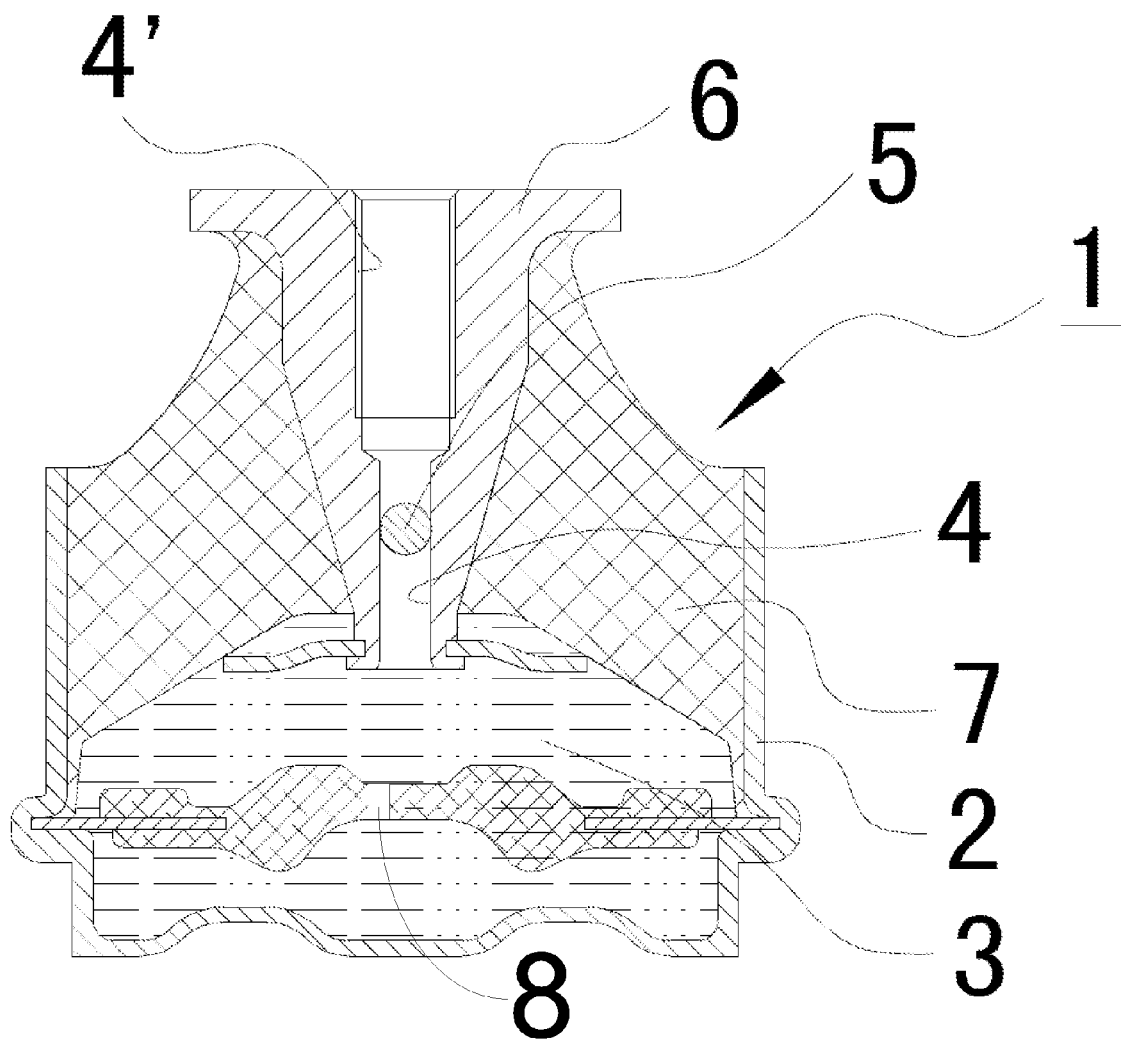
FIG. 2 is a schematic structural view of the hydraulic mount according to the present invention.

As shown in FIG. 2, the hydraulic mount 1 according to the present invention comprises a casing 2 and a support body arranged in an upper part of the casing 2, wherein, the casing 2 and the support body define a chamber 3 in a lower part of the interior of the casing 2, and the chamber 3 receives liquid (e.g., damping liquid). The chamber 3 is divided by a partition into an upper chamber and a lower chamber; an orifice 8 is formed in the partition, so that the upper chamber and the lower chamber are communicated with each other. A through hole 4 for communicated the chamber 3 with the exterior is formed in the support body, and a sealing member 5 is arranged in the through hole 4.

Wherein, the support body comprises a metal support 6 and an elastic body 7 formed around the metal support 6. The metal support 6 provides rigid support for the entire hydraulic mount 1, while the elastic body 7 (e.g., a vulcanized rubber member) formed around the metal support 6 can further absorb the vibrations. In that case, the through hole 4 may be formed in the metal support 6 or the elastic body 7. Preferably, the through hole 4 is formed in the metal support 6.

The sealing member 5 may be any component well known in the field that can seal a through hole, and the shape of the sealing member 5 may be determined according to the cross-sectional shape of the through hole, so that the sealing member 5 can be assembled in the through hole 4 and seal the through hole 4 well. For example, in the case the through hole 4 is formed in the metal support 6, the sealing member 5 may be a steel ball that is assembled in the through hole 4 by interference fitting. In the case the through hole 4 is formed in the elastic body 7, the sealing member 5 may be a rubber member that is assembled in the through hole 4 by interference fitting.

In the hydraulic mount according to the present invention, the damping liquid may be filled into the chamber 3 conveniently through the through hole 4, and the through hole 4 may be sealed with the sealing member 5 after the damping liquid is filled, so as to seal the damping liquid in the chamber 3; therefore, the filling operation of the hydraulic mount is more convenient and easier.

Usually, the hydraulic mount 1 must be connected to the engine when it is used. Therefore, preferably, a screw hole 4' designed to connect the hydraulic mount to the engine is formed in the hydraulic mount 1. More preferably, the screw hole 4' is formed in the rigid metal support 6, so as to ensure firm connection between the hydraulic amount 1 and the engine.

In that case, the through hole 4 and the screw hole 4' may be formed in the metal support 6 separately or arranged coaxially. Preferably, the screw hole 4' and the through hole 4 are formed in the metal support 6 coaxially. In that case, during the machining process, after the screw hole 4' designed to connect the hydraulic mount 1 to the engine is formed in the metal support 6, the through hole 4 can be formed simply by drilling down the screw hole 4' to the chamber 3. In that way, no other additional structure is required to connect the hydraulic mount to the engine, and the structure of the hydraulic mount can be simplified; furthermore, the screw hole and the through hole may be machined in one process, and thereby the machining procedures can be simplified; moreover, the structural design of the hydraulic mount can be optimized further In addition, the screw hole 4' may further be used to sealed connect a pipe with external thread on an end, such as the pipe that is designed to communicate the chamber 3 with a vacuum extractor 9 or a liquid tank 8 (to be introduced hereinafter) during the assembling process.

In an embodiment of the present invention, as shown in FIG. 2, a shoulder hole may be formed in the metal support 6, wherein, the outer part of the shoulder hole has a greater diameter and internal threads are formed in the hole wall thereof, so this part is the screw hole described above; while the inner part of the shoulder hole has a smaller diameter and is communicated with the chamber 3, so this part is the through hole described above. and the sealing member 5 is assembled in the part with the smaller diameter to seal the hole.

Figure 3:
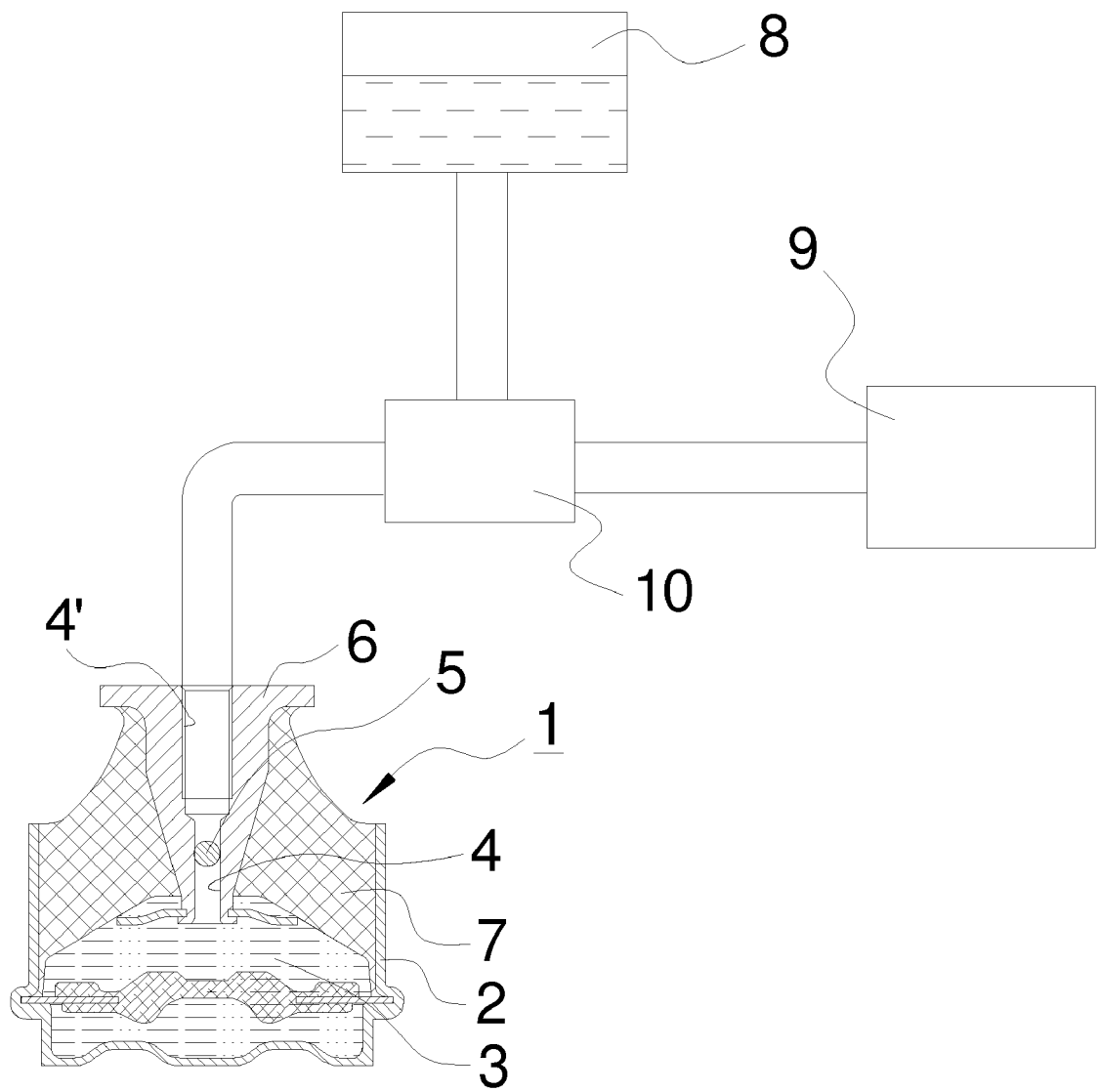
FIG. 3 is a schematic structural view of the filling device for the hydraulic mount according to the present invention.

The present invention further provides a filling device for the hydraulic mount 1 described above. As shown in FIG. 3, the filling device comprises a liquid tank 8 and a vacuum extractor 9, wherein, either the liquid tank 8 or the vacuum extractor 9 is connected to the through hole 4 in the hydraulic mount 1 in a sealed manner through a pipe. In a preferred case that a screw hole 4' is formed in the metal support 6 of the hydraulic mount 1 and the screw hole 4' and the through hole 4 are arranged coaxially, the pipe is connected to the screw hole 4' in a sealed manner.

In that way, during the process that the hydraulic mount 1 is assembled, the vacuum extractor 9 can be connected to the through hole 4 in the hydraulic mount 1 firstly when the filling operation is carried out, so as to extract the chamber 3 in the hydraulic mount 1 to a negative pressure state; then, the liquid tank 8 can be connected to the through hole 4 in the hydraulic mount 1, so as to suck the damping liquid in the liquid tank 8 into the chamber 3 in the hydraulic mount 1 under negative pressure; finally, the through hole 4 in the hydraulic mount 1 can be sealed with the sealing member 5; thus the filling operation is completed.

Since the filling device according to the present invention employs the vacuum extractor 9, any air in the chamber 3 of the hydraulic mount 1 can be extracted out completely; in addition, since the subsequent filling process is carried out in a sealed state, no air will enter into the chamber 3; therefore, it will be ensured that there is no air in the hydraulic mount after the filling operation, and thereby the damping performance of the hydraulic mount can be ensured. In addition, since the entire assembling and filling process needn't to be performed in a liquid environment, the visibility in the assembling process can be improved and the defective rate can be decreased effectively, and the workers' working environment can be improved greatly.

Wherein, the vacuum extractor 9 may be any device well known in the field with vacuum-pumping function, such as a vacuum pump. Preferably, if a vacuum pump is employed, the vacuum level may be set as required.

Usually, the connection manner for communicating either the liquid tank 8 or the vacuum extractor 9 with the through hole 4 in the hydraulic mount 1 may be implemented with any technique well known in the field. Preferably, the filling device further comprises a solenoid valve 10, which is arranged in the pipe that is designed to communicate the through hole 4 in the hydraulic mount 1 with the liquid tank 8 or the vacuum extractor 9, and is used to control either the liquid tank 8 or the vacuum extractor 9 to communicate with the through hole 4 in the hydraulic mount 1. For example, the solenoid valve may be a three-way solenoid valve, which can selectively control the communication between the through hole 4 in the hydraulic mount 1 and the liquid tank 8 or the vacuum extractor 9. In addition, preferably, the open/close time of the solenoid valve 10 may be set as required, so as to control the filling mount of the damping liquid.

Hereunder the operation of the filling device according to the present invention will be described in a preferred embodiment of the present invention.

Firstly, open the vacuum pump and set the vacuum level to $-1 \times 10^{-2}$ Pa. When the vacuum level reaches to the set value, control the solenoid valve 10 to communicate the vacuum pump with the through hole 4 in the hydraulic mount 1 through the pipe and keep the communication between the liquid tank 8 and the through hole 4 in the hydraulic mount 1 in a blocked state. Set the solenoid valve 10 to keep the current state for 5 s, so as to pump the chamber 3 of the hydraulic mount to $-1 \times 10^{-2}$ Pa pressure state. When the set time is reached, control the solenoid valve 10 to block the communication between the vacuum pump and the through hole 4 in the hydraulic mount 1 and communicating the liquid tank 8 with the through hole 4 in the hydraulic mount 1 Now, set the solenoid valve 10 to keep the current state for 5 s, so as to suck a predetermined amount of damping liquid from the liquid tank 8 into the chamber 3 of the hydraulic mount 1 under the negative pressure in the chamber 3. When the preset time is reached, control the solenoid valve 10 to block the communication between the liquid tank 8 and the through hole 4 in the hydraulic mount 1, and keep the communication between the vacuum pump and the through hole 4 in the hydraulic mount 1 in the blocked state. Next, remove the hydraulic mount 1 from the filling device, and utilize a pressing machine to press the steel ball that serves as the sealing member 5 into the through hole 4 in the hydraulic mount 1, so as to seal the through hole 4. In that way, the entire filling process is completed.

The invention claimed is:

1. A liquid filling device for pumping liquid into a chamber inside a hydraulic mount through a through hole, the device comprising:
   a liquid tank;
   a vacuum pump; and
   a three-way solenoid valve, wherein the solenoid valve is connected to the liquid tank through a first pipe and to the vacuum pump through a second pipe and the through hole of the hydraulic mount through a third pipe, respectively,
   wherein the solenoid valve is configured to:
      first block a passage to the liquid tank and open a passage to the vacuum pump such that air can be removed from the chamber of the hydraulic mount through the vacuum pump and
      then block the passage to the vacuum pump and open the passage to the liquid tank such that liquid can flow into the chamber through the through hole.

2. The liquid filling device of claim 1, wherein the chamber of the hydraulic mount is reduced to be below a predefined air pressure level by the vacuum pump.

3. The liquid filling device of claim 2, wherein the predefined air pressure level is $-1 \times 10^{-2}$ Pa.

* * * * *